(12) United States Patent
Paul

(10) Patent No.: US 9,026,809 B2
(45) Date of Patent: May 5, 2015

(54) POLARITY CORRECTION BRIDGE CONTROLLER FOR COMBINED POWER OVER ETHERNET SYSTEM

(71) Applicant: Linear Technology Corporation, Milpitas, CA (US)

(72) Inventor: Michael Paul, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 318 days.

(21) Appl. No.: 13/668,943

(22) Filed: Nov. 5, 2012

(65) Prior Publication Data

US 2014/0129850 A1     May 8, 2014

(51) Int. Cl.
*G06F 1/26* (2006.01)
*H04L 12/10* (2006.01)
*H02H 11/00* (2006.01)

(52) U.S. Cl.
CPC ........ *G06F 1/26* (2013.01); *H04L 12/10* (2013.01); *H02H 11/002* (2013.01)

(58) Field of Classification Search
CPC .................................................... G06F 1/26
USPC ............................................ 713/300; 307/43
See application file for complete search history.

(56) References Cited

U.S. PATENT DOCUMENTS

| | | | |
|---|---|---|---|
| 7,299,368 B2 * | 11/2007 | Peker et al. | 713/300 |
| 7,511,515 B2 | 3/2009 | Herbold | |
| 8,341,440 B2 * | 12/2012 | Diab | 713/300 |
| 8,581,438 B2 * | 11/2013 | Heath et al. | 307/43 |
| 2005/0122140 A1 | 6/2005 | Peker et al. | |
| 2007/0171690 A1 * | 7/2007 | Apfel | 363/127 |
| 2008/0005598 A1 | 1/2008 | Landry et al. | |
| 2008/0168283 A1 * | 7/2008 | Penning | 713/310 |

(Continued)

FOREIGN PATENT DOCUMENTS

| | | |
|---|---|---|
| WO | 2011063225 A2 | 5/2011 |
| WO | 2013032789 A1 | 3/2013 |

OTHER PUBLICATIONS

Haimeng Wu et al., "50W Power Device (PD) Power in Power over Ethernet (PoE) System with Input Current Balance in Four-Pair Architecture with Two DC/DC Converters", Applied Power Electronics Conference and Exposition (APEC), 2010 25th Annual IEEE, Feb. 21, 2010, pp. 575-579, Piscataway, NJ, USA.

(Continued)

*Primary Examiner* — Chun Cao
(74) *Attorney, Agent, or Firm* — Patent Law Group LLP; Brian D. Ogonowsky

(57) ABSTRACT

A system for combining power to a load in a Powered Device (PD) using Power Over Ethernet (PoE) receives power from a first channel and power from a second channel, via four pairs of wires. A MOSFET bridge for each channel is initially disabled. A bridge controller IC simultaneously senses all the voltages and controls the bridge MOSFETs. The bridge controller IC also contains a first PoE handshaking circuit. A second PoE handshaking circuit is external to the bridge controller IC and operates independently. The body diodes in the MOSFET bridge initially couple the first channel to the second PoE handshaking circuit while isolating the second channel. The second handshaking circuit then couples the first channel to the load. The first handshaking circuit then carries out a PoE handshaking routine for the second channel. Ultimately, the bridge controller controls the bridge MOSFETs to couple both channels to the load.

24 Claims, 7 Drawing Sheets

(56) References Cited

U.S. PATENT DOCUMENTS

2011/0125341 A1 5/2011 Heath et al.
2012/0303981 A1* 11/2012 Heath et al. .................. 713/300
2013/0049469 A1* 2/2013 Huff et al. ...................... 307/62

OTHER PUBLICATIONS

European Patent Office for Application 13186007.4 , "Extended European Search Report", Mar. 2, 2015, 12 pages.

* cited by examiner

POLARITY CORRECTION BRIDGE CONTROLLER FOR COMBINED POWER OVER ETHERNET SYSTEM

FIELD OF THE INVENTION

This invention relates to Power Over Ethernet (PoE), where power is transmitted over data lines.

BACKGROUND

It is known to transmit power over data lines to power remote equipment. Power Over Ethernet (PoE) is an example of one such system. In PoE, limited power is transmitted to Ethernet-connected equipment (e.g., VoIP telephones, WLAN transmitters, security cameras, etc.) from an Ethernet switch. DC power from the switch is transmitted over two sets of twisted pair wires in the standard CAT-5 cabling. The same two sets of twisted pair wires may also transmit differential data signals, since the DC common mode voltage does not affect the data. In this way, the need for providing any external power source for the "Powered Devices" (PDs) can be eliminated. The standards for PoE are set out in IEEE 802.3, incorporated herein by reference.

Providing power over data lines is applicable to other existing systems and future systems. Various new systems using power over data lines may be standardized by the IEEE or other groups.

Although the present inventions may be applied to any system using power over data lines, a typical PoE system will be described as an example.

FIG. 1 represents a typical Ethernet system using PoE. In the example of FIG. 1, a "Power Sourcing Equipment" (PSE) 12 may be any Ethernet device that supplies power and data to a PD. The PSE 12 and PD 14 are typically connected via a standard CAT-5 cable terminated with the standard Ethernet 8-pin (four twisted pairs) connector. Only two of the twisted pairs are typically needed for PoE and data, so there are two spare pairs of wires.

The PSE 12 is typically powered by the mains voltage (120 VAC) and uses either an external or internal voltage converter 16 to generate a DC voltage between 44-57 volts. The PoE standards require the PoE to supply a minimum of 37 volts at the PD. The voltage drop along the cable increases with distance.

Two of the twisted pairs of wires 18 and 20 are assigned to carry the PoE power, and these pairs may also carry differential data. The remaining two pairs or wires 21 and 22 are also shown. All pairs in use are terminated at the PD 14 by transformers, such as transformers 23 and 24. It is assumed that the wires 18 provide 44 volts and the wires 20 are connected to ground. A connection is made to the center tap of transformers 23 and 24 to provide the 44 volts to the PD 14. Since the DC voltage is common mode, it does not affect the differential data. Other conventional termination circuitry is also included in the termination block 25, such as polarity correction circuitry and switches.

The 44 volts is applied to a DC-DC converter 26 for converting the voltage to any voltage or voltages required by the PD 14. The load 28 (e.g., a security camera) is powered by the converter 26 and communicates with the PSE 12 via the twisted wire pairs.

The IEEE standards require certain low current handshaking procedures between the PSE 12 and PD 14 in order to detect the presence of a PoE-powered device and in order to convey the pertinent characteristics of the PSE 12 and PD 14 prior to the PSE 12 making the full power available to the PD 14. The detection/classification circuitry 30 carries out the routine and provides the classification pulses. The PSE 12 also contains circuitry for controlling the handshaking routine.

Below is a simplified summary of the handshaking protocol between the PSE 12 and the PD 14.

When a PoE-enabled Ethernet cable is plugged into the PD 14, the PSE 12 interrogates the PD 14 to determine if it is PoE-enabled. This period is termed the detection phase. During the detection phase, the PSE 12 applies a first current limited voltage for a fixed interval to the PD 14, via the wires 18 and 20, and then applies a second current limited voltage for a fixed interval, while looking for a characteristic impedance of the PD 14 (about 25K ohms) by detecting the resulting current. If the correct impedance is not detected, the PSE 12 assumes that the load is not PoE-enabled and shuts down the PoE generating end. The system then operates as a standard Ethernet connection.

If the signature impedance is detected, the PSE 12 moves on to an optional classification phase. The PSE 12 ramps up the voltage to the PD 14. The PSE 12 generates either one pulse (indicating it is a Type 1 PSE) or two pulses (indicating it is a Type 2 PSE). The PD 14 responds to the classification pulses with certain current levels to identify whether the PD 14 is Type 1 or Type 2. A Type 1 PD requires less than 13 W. A Type 2 PD requires up to a maximum of 25.5 W. Various classes (e.g., five classes), each associated with a maximum average current level and a maximum instantaneous current level, within these types may also be identified. A classification resistance may be used. The PSE 12 then uses this power demand information to determine if it can supply the required power to the PD 14, and the PD 14 uses the information to determine if it can fully operate with the PSE 12. There are maximum time windows for the detection and classification phases (e.g., 500 ms).

Other standards may be implemented.

On completion of the detection and classification phases, the PSE 12 ramps its output voltage above 42 V. Once an under-voltage lockout (UVLO) threshold has been detected at the PD 14, an internal FET is turned on to couple the full voltage to the DC-DC converter 26 to power the load 28. At this point, the PD 14 begins to operate normally, and it continues to operate normally as long as the input voltage remains above a required level.

Recently, it has been proposed to supply up to 51 W (or more) to a PD via the four pairs of wires 18, 20, 21, and 22 by supplying up to 25.5 W using the data wires 18 and 20 and up to 25.5 W using the spare wires 21 and 22, while still complying with the IEEE standards for PoE handshaking FIG. 2 illustrates a proposed system by Cisco Systems referred to as Universal PoE or UPoE. PSE1 and PSE2 may be conventional Type 2 PSEs and each supplies up to 25.5 W (and up to 30 W in some proposed systems). Each supplies about 44 volts across their associated pairs of wires 44-47 to a single PD 50. The PD 50 uses a conventional 8-pin Ethernet connector. PSE1 and PSE2 may be located in the same Ethernet switch 51 and each may have identical power supplies and detection/classification circuitry. PSE1 and PSE2 may operate independently and do not need to communicate with each other.

A conventional diode bridge polarity correction circuit 52 and 53 for each of the two channels ensures the correct voltage polarity is applied to the load 56, such as 44 volts at the top terminal and zero volts at the bottom terminal Conventional PD interface controllers 58 and 59, one for each channel, provide the detection resistor 60 (about 25K ohms) and a programmable classification current source 61.

At the end of a successful handshaking routine, the controllers 58 and 60 turn on their respective MOSFETs 62 and 64 to supply the 44 volts across the load 56. The load 56 may include a DC-DC converter for converting the 44 volts to any voltage required by the load 56. The body diodes of the MOSFETs 62 and 64 are shown.

In another prior art embodiment, the MOSFETs 62 and 64 are connected in series with the ground conductor, rather than the positive voltage conductor, to create the load current loop for a single channel.

The controllers 58 and 59 and the PSEs (PSE1 and PSE2) perform their detection and classification routines independently and in parallel. Since the PSE1 and PSE2 are assumed to be identical and they share the same Ethernet cable, it is assumed that the final voltages supplied by the PSE1 and PSE2 to the PD 50 inputs are identical (e.g., 44 volts).

An extra set of diodes 66 and 68 is needed to prevent the power from a first channel (e.g., the PSE1 channel) from feeding into the second channel (e.g., the PSE2 channel). This allows the detection and classification parameters of one channel to not be affected by the other channel. The extra diodes 66 and 68 also allow the "negative voltage" bridge diodes to turn on, since, otherwise, the ground voltage from one channel would be at the anodes of the "negative voltage" bridge diodes in the other channel after one of the MOSFETs 62 or 64 turned on, preventing those "negative voltage" diodes from becoming forward biased.

Once both MOSFETs 62 and 64 have been turned on, the power from PSE1 and PSE2 is supplied in parallel to the load 56. This is typically up to 51 W but may be up to 60 W.

Accordingly, in the UPoE system of FIG. 2, there are three diode drops in each channel's power loop, causing a total of about 2.5 W of wasted power at the maximum load power of about 51 W. Other drawbacks exist in the system of FIG. 2.

What is needed is a system for combining the powers from two PSE channels with a higher efficiency than the prior art.

SUMMARY

A PoE bridge controller IC controls a MOSFET bridge for polarity correction for two PSE channels (a PSE1 channel and a PSE2 channel). Typically, a single Ethernet switch provides the PSE channels, and may provide many more channels. The MOSFET bridge couples the power from both channels to a single load. If the PSE's each supply a Type 2 power of 25.5 W, the maximum power applied to the load can therefore be 51 W. Higher power is possible. A single PD interface controller IC is used. The voltage drop across a turned on MOSFET is much less than that of a forward biased diode so there is improved efficiency.

The PSE1 and PSE2 channels are connected to the bridge controller IC so that the bridge controller IC simultaneously detects the voltages from both channels and the voltage across the load. As described below, the control technique prevents one channel from interfering with the detection and classification of the other channel and allows the proper voltage polarity coupling without the use of any blocking diodes.

It will be assumed that the PSE1 channel is to be connected to the load first. The Ethernet switch, having multiple ports including the PSE1 and PSE2 channels, typically performs the PoE handshaking routines in sequence, port-by-port.

The current limited voltage provided by the PSE1 channel for the handshaking phase is polarity corrected (if needed) by the body diodes of MOSFETs making up the MOSFET bridge for the PSE1 channel. The bridge MOSFETs for the PSE1 channel and PSE2 channel are disabled during this phase, and the bridge controller IC does not draw significant current. Therefore, the bridge controller IC does not interfere with the handshaking for the PSE1 channel. The forward biased body diodes couple the voltage from the PSE1 channel to a PD interface controller (typically a separate IC).

The PD interface controller then performs the conventional detection and classification for the PSE1 channel. If it is detected that the PSE1 channel is not providing the proper PoE signals, the PD interface controller does not close a MOSFET in series with the load, so that the PSE1 channel power path remains isolated from the load. If the PoE handshaking routine is successful, the PD interface controller closes the series MOSFET to connect the PSE1 channel power to the load. The load can now receive up to 25.5 W from the PSE1 channel. The PD interface controller then typically disconnects the detection and classification circuitry from the loop.

The bridge controller IC is powered from the voltage supplied by the PSE1 channel across the load. The bridge controller IC senses that the PSE1 channel has been connected to the load by, for example, detecting the voltage drop across the series MOSFET, and, in response, closes the proper MOSFETs in the bridge to increase efficiency. The body diodes of the MOSFETs for the PSE1 channel therefore no longer conduct. The full power from the PSE1 channel may now be efficiently provided to the load.

The Ethernet switch detects that the full voltage from the PSE1 channel is being supplied and begins the low power PoE handshaking for the PSE2 channel. The bridge controller IC closes internal switches in the bridge controller IC to couple the PSE2 channel to a detection and classification circuit in the bridge controller IC to carry out a conventional PoE handshaking routine. The detection and classification circuitry in the bridge controller IC is isolated from the higher load voltages by the "open" bridge MOSFETs for the PSE2 channel.

If it is detected that the PSE2 channel is not providing the proper PoE signals, the bridge controller IC does not close the bridge MOSFETs for the PSE2 channel, so that the PSE2 channel power path is isolated from the load. If the PoE handshaking routine is successful, the bridge controller IC detects the various voltages in the system to determine polarities and closes the proper MOSFETs in the bridge to connect the PSE2 channel power to the load. The bridge controller IC ensures that one channel does not source power into the other channel by monitoring the various voltage levels before and after closing the bridge MOSFETs. The load now has PSE1 and PSE2 supplying PoE in parallel.

The terms PSE and PD are used throughout this disclosure to identify equipment that supplies power and equipment that receives the power, and such equipment/devices are not limited to Ethernet equipment/devices.

Various other embodiments are described.

BRIEF DESCRIPTION OF THE DRAWINGS

Elements that are the same or equivalent are labeled with the same numeral.

DETAILED DESCRIPTION

The operation of the inventive circuit will be described with reference to the flowchart of FIG. 9.

Figure 3:
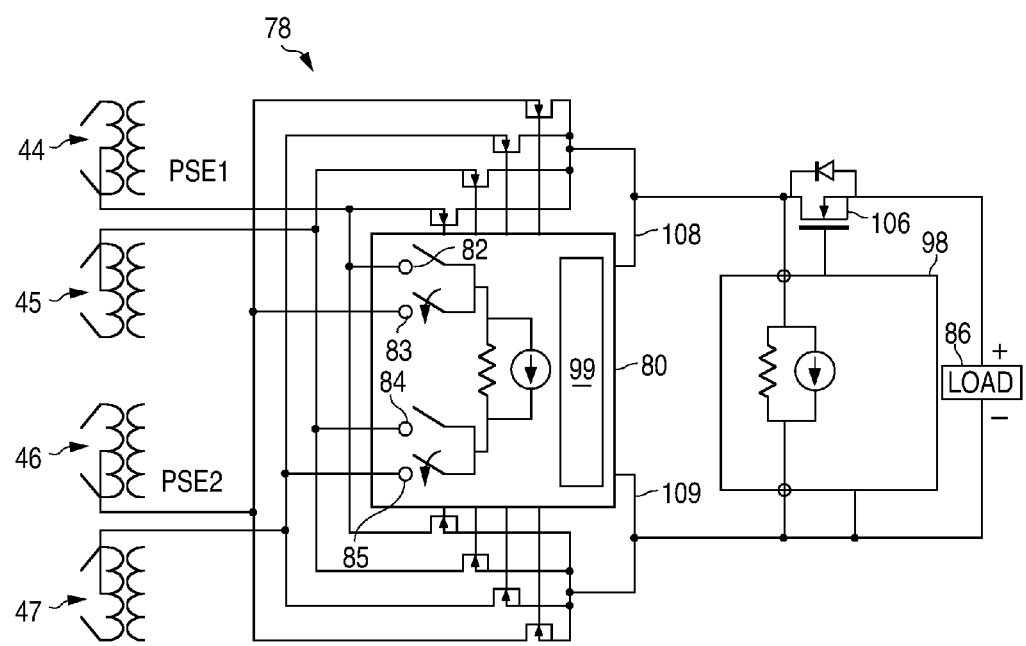
FIG. 3 illustrates a system for combining power from two PSE channels to power a single PD load in accordance with one embodiment of the present invention.

FIG. 3 illustrates one embodiment of the inventive system that combines the power from two PSE channels (using the data wires and spare wires in a conventional Ethernet cable) to power a single load. The "voltage polarity correction" diode bridge for each channel is replaced by a MOSFET bridge or other suitable active bridge to minimize voltage drops across the bridge. As discussed later, the MOSFET bridge is also used to isolate detection and classification circuitry for one channel from the load voltage.

Figure 1:
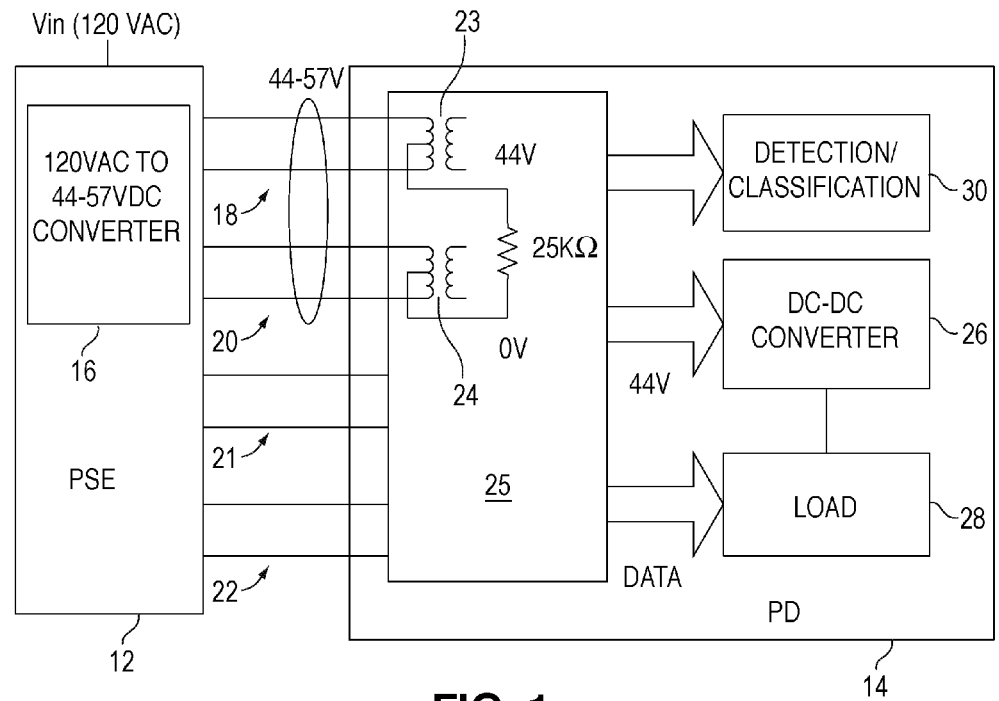
FIG. 1 illustrates a conventional PoE-enabled Ethernet system.
Figure 4:
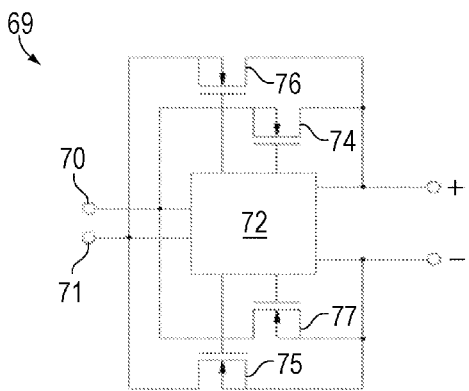
FIG. 4 illustrates any of the well known active bridge circuits that may replace a diode bridge circuit for polarity correction in a PoE system.

FIG. 4 illustrates any of a number of well-known MOSFET bridges 69 that may be used for correcting the polarity of the voltage supplied by a single PSE channel. The incoming voltage is provided across input terminals 70 and 71. The control circuit 72 uses either comparators or passive circuitry in a well-known manner to turn on MOSFETs 74 and 75 if it is detected that the incoming voltage polarity is correct (a higher voltage is applied to the upper input terminal 70). MOSFETs 76 and 77 are turned on if it is detected that the incoming voltage polarity is improper (a higher voltage is applied to the lower input terminal 71). Basically, if the internal body diode of a MOSFET is forward biased, the MOSFET should be turned on. It is known to use such a MOSFET bridge for correcting voltage polarity in a PoE system, so further circuit detail is not needed.

Figure 2:
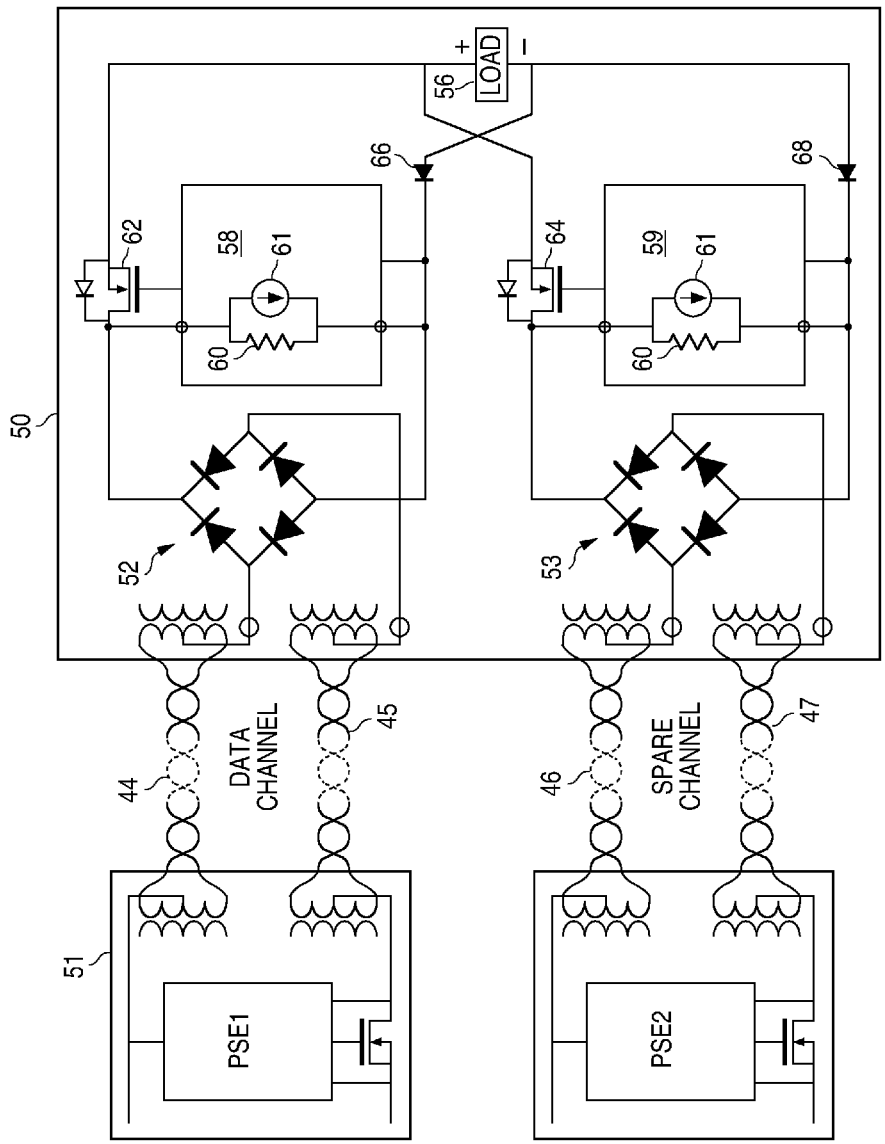
FIG. 2 represents a known UPoE system for combining power from two PSE channels to power a single PD load.

However, even if such a MOSFET bridge replaced each of the diode bridges of FIG. 2, the MOSFETs could not be properly turned on since, after one of the PSE channels was coupled to the load, that voltage would be coupled to the other MOSFET bridge, preventing an accurate polarity detection and possibly resulting in one channel sourcing current into the other channel. Further, without blocking diodes, one channel would also interfere with the detection and classification routine of the other channel. In FIG. 2, the bridges operate independently so there is no knowledge of the voltages in the other channel.

FIG. 3 illustrates a PD 78 in accordance with one embodiment of the invention. The system uses a MOSFET bridge for each of the two channels, PSE1 and PSE2 (connected to wires 44/45 and 46/47, respectively, as shown in FIG. 2), where a bridge controller IC 80 simultaneously detects the voltages on the four input terminals 82-85 from PSE1 and PSE2. PSE1 and PSE2 may be conventional PSEs, such as shown in FIG. 2, so do not have to be specialized for operation with the PD 78 of the present invention. Therefore, the invention is backwards compatible with conventional PSEs. In the example, PSE1 and PSE2 are Type 2, each providing PoE up to 25.5 W at about 44 volts.

The operation and construction of the system will be described with respect to FIGS. 5-8. The PSE1 and PSE2 channels are assumed to be ports of a single Ethernet switch, perhaps providing many more channels to other PDs. It is conventional for an Ethernet switch to perform the PoE handshaking routines for the various channels in sequence, port-by-port. Therefore, in the example, it is assumed that the PSE1 channel will be connected to the load 86 first.

Figure 9:
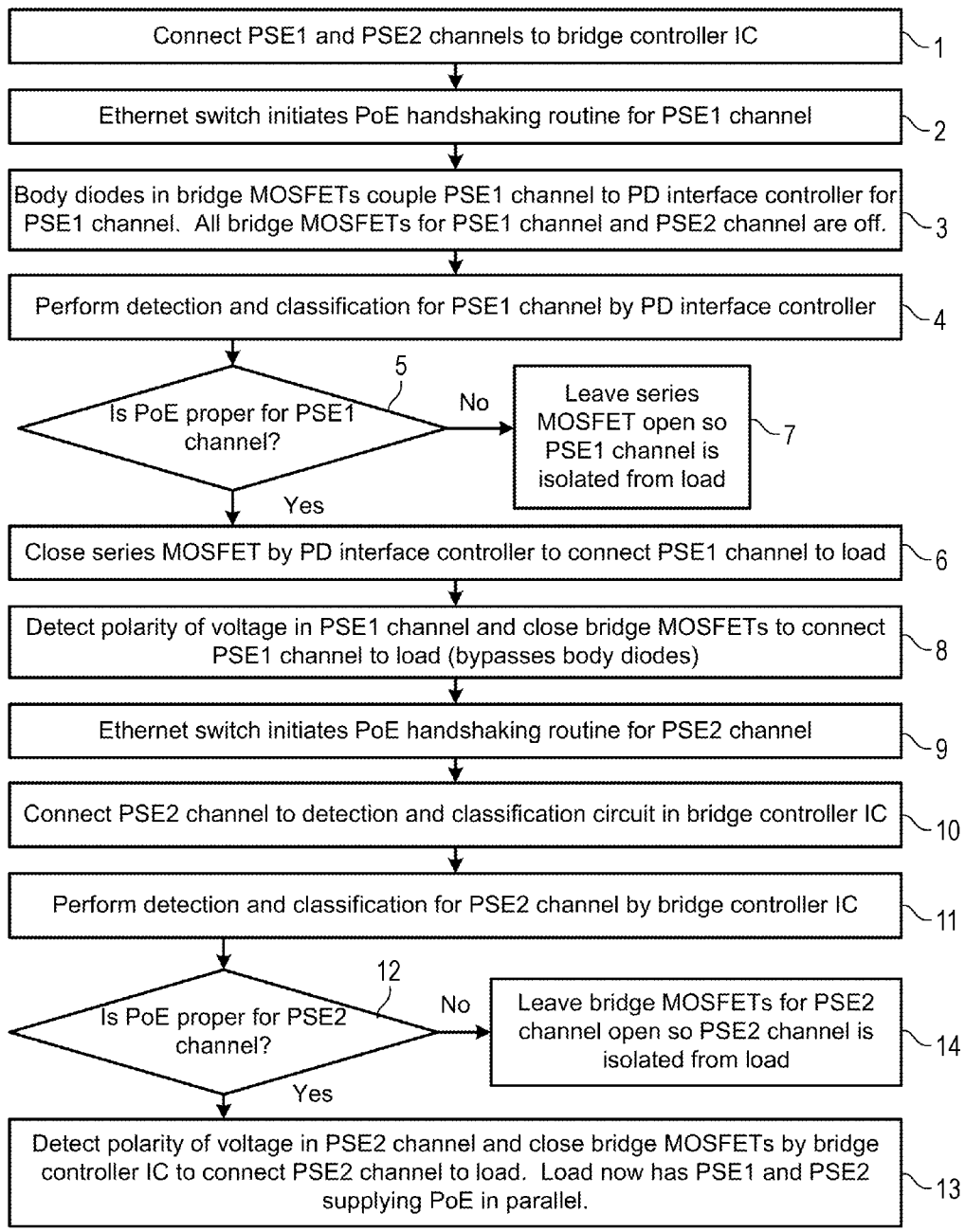
FIG. 9 is a flowchart identifying steps performed in accordance with one embodiment of the invention.

In step 1 of FIG. 9, the PSE1 and PSE2 channels are connected to the bridge controller IC 80 by a standard CAT-5 cable or other suitable Ethernet cable.

In step 2, the Ethernet switch (which may be conventional) initiates the PoE detection and classification (handshaking) routine for the PSE1 channel.

Figure 5:
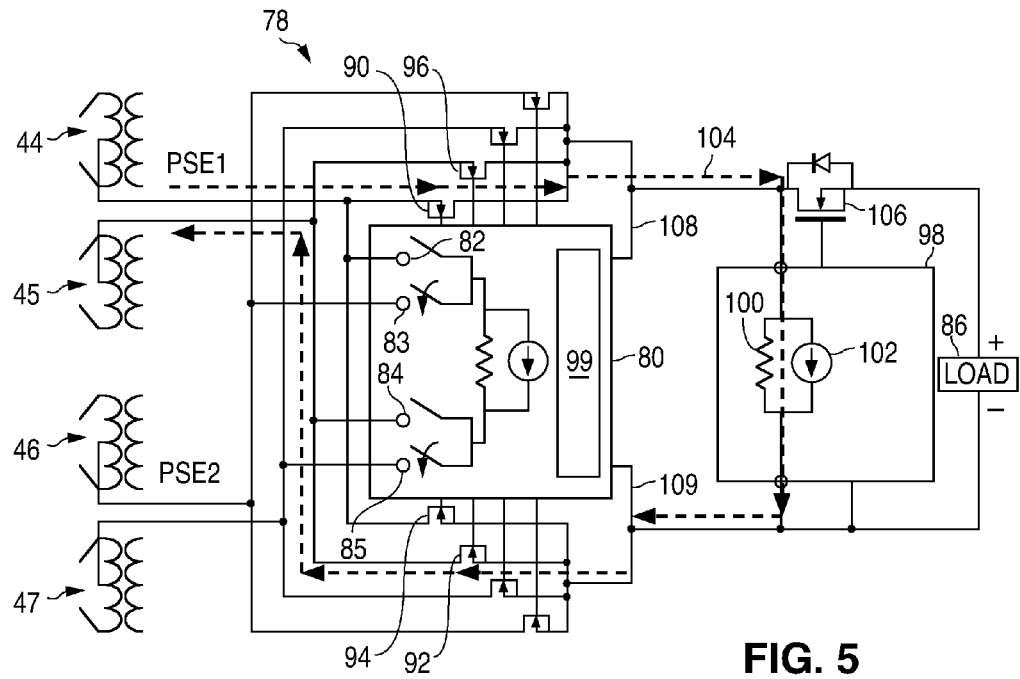
FIG. 5 illustrates the current conducted by the system of FIG. 3 when detecting and classifying the PSE1 channel.

In step 3, and as shown in FIG. 5, the body diodes in the MOSFETs 90 and 92 (assuming the correct polarity) are forward biased. All the bridge MOSFETs are turned off at this time. Therefore, the proper voltage polarity is ensured and the inputs into the PD interface controller 98 are connected to the PSE1 channel.

A detection circuit 99 internal to the bridge controller IC 80 detects the four voltages from the PSE channels (from the inputs 82-85) as well as the voltage across the load 86 and other signals, described later.

The PD interface controller 98 may be a conventional PD interface controller IC and contains a 25K ohm detection resistor 100 and a programmed current source 102 that supplies the current pulses (e.g., 1-3 pulses) to the PSE1 to identify its class, as previously described. Other well-known circuitry may be used in the classification process, such as a classification resistance to draw a predetermined current to identify the power needs of the PD. The controller 98 contains logic to carry out the conventional PoE handshaking protocol, in conjunction with the Ethernet switch. The current path is illustrated in FIG. 5 as current 104. (Step 4 in FIG. 9.)

Figure 6:
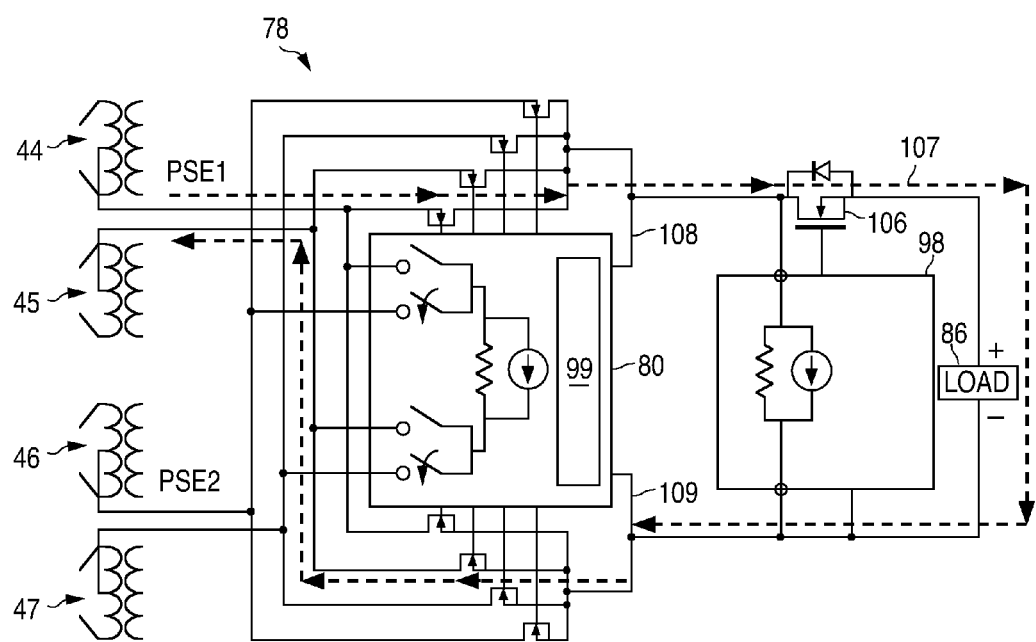
FIG. 6 illustrates the current conducted by the system of FIG. 3 after the PSE1 channel is coupled to the load.

Once the controller 98 has detected that the PSE1 channel meets the requirements for Type 2 PoE, and the PSE1 channel has ramped up the PoE voltage beyond an under-voltage lockout (UVLO) threshold, the controller 98 turns on the series MOSFET 106 to couple the PSE1 channel across the PD load 86, as shown by the current 107 in FIG. 6. (Steps 5 and 6 in FIG. 9.) The MOSFET 106 body diode is shown. The load 86 may be any device to be powered by PoE. Accordingly, the load 86 is supplied up to 25.5 W by the PSE1 channel. The PD interface controller 98 may now disconnect the detection resistor 100 and current source 102. The load 86 will typically contain a DC-DC converter that receives the voltage from the channel(s), such as 44 volts, and converts the voltage to a regulated voltage required by the load 86 (e.g., 5 volts). When the output voltage of the converter meets a certain threshold, the converter may issue a POWER GOOD signal, indicating to the load 86 that the load 86 may now operate normally.

If the PoE handshaking routine was unsuccessful, such as no valid detection resistor being sensed, the controller 98 leaves the MOSFET 106 open so the PSE1 power path is isolated from the load 86. (Step 7 in FIG. 9.)

The bridge controller IC 80 detects that the PSE1 channel is connected to the load 86 rather than still undergoing detection and classification. This may be done by the detection circuit 99 detecting the voltage or impedance across the terminals 108 and 109, or by detecting another signal indicating that the PSE1 channel has been connected to the load 86. In one embodiment, the voltage across the MOSFET 106 is detected. If the voltage drop is low, it signifies that the PSE1 channel is coupled to the load 86. The detection circuit 99 may also be connected to receive a POWER GOOD signal from the DC-DC converter in the PD 78, indicating that the output voltage of the converter is above a certain threshold.

Upon the detection that the PSE1 channel is connected to the load 86, the bridge controller 80 detects the polarity of the voltage applied to the controller IC 80 input terminals 82 and 84. (Step 8 of FIG. 9.) This may be done by comparing the voltages using conventional techniques. Such conventional polarity detection circuitry is not shown for simplicity. If the voltage at input terminal 82 is higher than the voltage at terminal 84, MOSFETs 90 and 92 are turned on, as shown by the flow of current 107 in FIG. 6. If the opposite is true, MOSFETs 94 and 96 are turned on. Therefore, during the high power stage, there are no diode drops in the loop, and efficiency is maximized by the bridge MOSFETs.

The bridge controller IC 80 is powered from the voltage supplied by the PSE1 channel across the load 86 and may be supplied via the input terminals 108 and 109.

One example of a MOSFET bridge is described in US Publication 2100/0125341, by Jeffrey Heath et at., entitled Providing Power to Powered Device Having Multiple Power Supply Inputs, incorporated herein by reference. The MOSFET bridge voltage detection and control circuitry is identified as circuit 99 within the bridge controller IC 80. The bridge MOSFETs may be all n-channel types or a mixture of p-channel and n-channel types, depending on the available gate voltages.

Since the bridge MOSFETs for the PSE2 channel are disabled during the handshaking phase for the PSE1 channel, there is no interference by the PSE2 channel with the handshaking phase for the PSE1 channel.

After the PSE1 channel PoE is supplied to the load 86 (which may take less than 1 second after the initiation of the handshaking phase), the Ethernet switch begins the handshaking routine for the PSE2 channel. (Step 9 in FIG. 9.)

Figure 7:
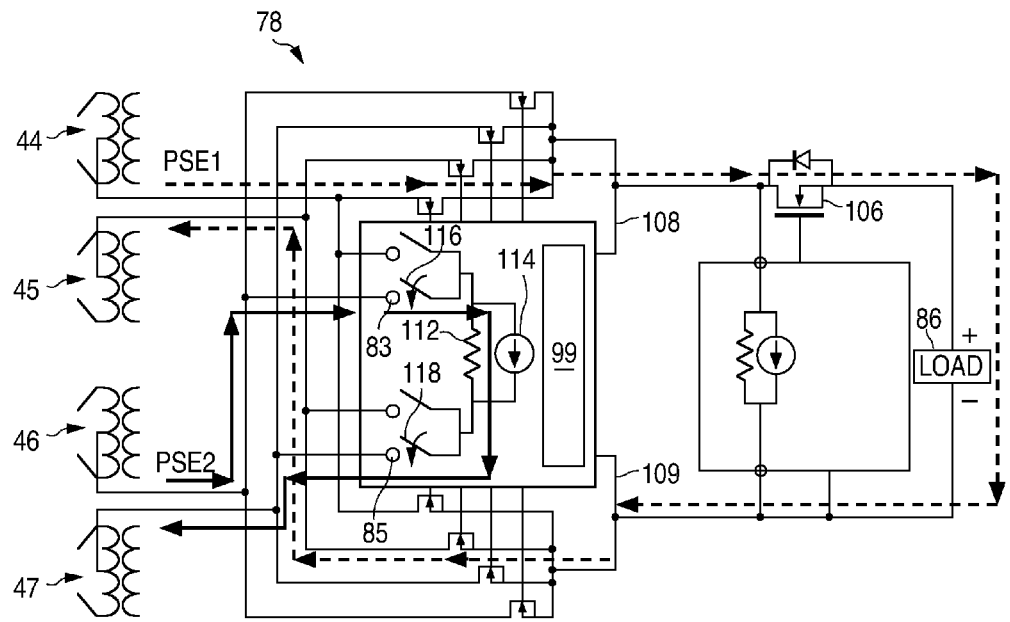
FIG. 7 illustrates the current conducted by the system of FIG. 3 when detecting and classifying the PSE2 channel.

As shown in FIG. 7, the bridge controller IC 80 contains a PoE detection resistor 112, a current source 114 (for classification), and conventional control logic (not shown) for carrying out a conventional PoE handshaking protocol. The detection resistor 112 may instead be external. After the bridge controller IC 80 detects that the PSE1 channel is connected to the load 86, the bridge controller IC80 closes transistor switches 116 and 118, pursuant to a state machine or other firmware controller, to couple the PSE2 channel across the resistor 112 and to supply the current pulses consistent with a Type 2 handshaking protocol. (Steps 10 and 11 in FIG. 9.) The detection and classification circuit in the bridge controller IC 80 may be otherwise conventional.

Once it is determined that the PSE2 channel is PoE-compatible with the PD 78, the controller IC 80 determines the proper polarity of the voltage applied across the PSE2 channel input terminals 83 and 85. (Steps 12 and 13 in FIG. 9.) Such detection is performed by the detection circuit 99 using conventional techniques. The circuit 99 also determines when the rising voltage supplied by the PSE2 channel equals the voltage across the load 86 (at terminals 108 and 109) to prevent the PSE2 channel from sinking any current from the PSE1 channel. If the polarity and voltage level are proper, the controller IC 80 then controls the bridge MOSFETs 126 and 128 to turn on to couple the PSE2 channel to the load 86. The current flow from the PSE2 channel through the load 86 is shown by current 132 in FIG. 8. The bridge controller 80 IC continues to monitor the respective voltages and controls the bridge MOSFETs to ensure that one channel does not sink current from the other channel.

If the voltage polarity was incorrect, the MOSFETs 136 and 138 would have been turned on.

If the PoE handshaking routine for the PSE2 channel was unsuccessful, such as no valid resistor 112 being detected, the bridge MOSFETs for the PSE2 channel would remain open so the PSE2 power path remains isolated from the load 86. (Step 14 in FIG. 9.)

Accordingly, the bridge MOSFETs for the PSE2 channel substitute for a series MOSFET (such as MOSFET 62 or 64 in FIG. 2) controlled by a conventional PD interface controller.

Now, the load 86 power is supplied by the parallel connection of the PSE1 channel and the PSE2 channel. The MOSFETs controlled by the bridge controller IC 80 serve the dual purpose of voltage polarity correction for both channels and coupling one channel (the PSE2 channel in the example) to the load 86, while the PD interface controller 98 controls the MOSFET 106 for coupling the other channel (the PSE1 channel in the example) to the load. By isolating the PSE2 channel from the downstream components until after the PSE1 channel has been detected as being coupled to the load 86, there is no interference with the detection and classification for the PSE1 channel or the voltage polarity correction for the PSE1 channel, and there is no sourcing of current from one channel to the other. Further, the detection and classification circuitry for the PSE2 channel is isolated from the PSE1 channel by the open bridge MOSFETs controlled by the bridge controller IC 80 during the handshaking phase for the PSE2 channel. Accordingly, there is no requirement for any diodes to block any currents from interfering with the polarity correction or the detection and classification, or to prevent sourcing of current from one channel to another channel. Therefore, there is no wasted power due to diode drops.

In another scenario, the PSE2 channel is coupled to the load 86 first via the bridge MOSFETs and the PD interface controller 98, and the PSE1 channel is coupled to the load 86 after the detection and classification phase performed by the bridge controller IC 80 and the closing of the bridge MOSFETs. In such a case, the bridge controller IC 80 would close the internal switches 144 and 145 (FIG. 8) during the handshaking phase. The first channel that initiates the low power handshaking routine is the one that is coupled to the controller 98.

The active bridge may comprise switches other than MOSFETs to achieve low voltage drops. The switches may be on the same IC as the bridge controller IC 80.

Figure 10:
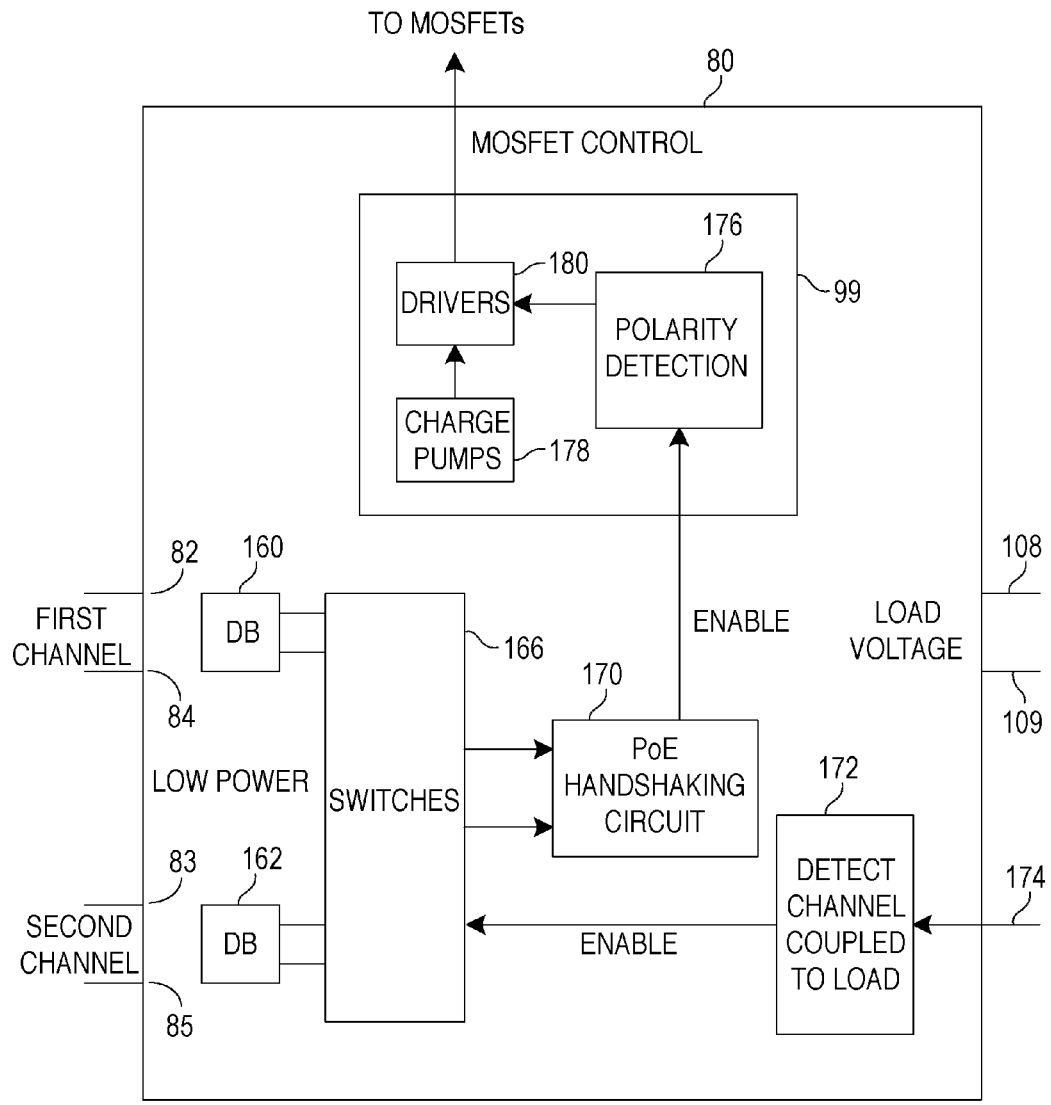
FIG. 10 illustrates various functional units in the bridge controller IC in accordance with one embodiment of the invention.

FIG. 10 illustrates some functional units internal to the bridge controller IC 80 in one embodiment. Other implementations are envisioned. The various interconnections between the units are not shown for simplicity.

The bridge controller IC 80 may be essentially dormant during the handshaking phase of the PSE1 channel since the low power is conducted by the body diodes of the bridge MOSFETs. Since the internal circuitry of the bridge controller IC 80 essentially draws no current from the PSE1 channel during the handshaking for the PSE1 channel, the controller IC 80 circuitry will not affect the handshaking for the PSE1 channel. After the successful handshaking phase for the PSE1 channel when the full PoE voltage is applied to the load, the proper bridge MOSFETs for the PSE1 channel are then closed as described with respect to FIGS. 5 and 6. The polarity detection and bridge control for this first channel may be otherwise conventional. The below description relates primarily to the processing of the other channel's signals after the bridge MOSFETs are closed for the first channel.

The input terminals 82-85 for the PSE1 channel and PSE2 channel are connected to a respective diode bridge 160 and 162, internal to the bridge controller IC 80, for polarity correction. The diode bridges 160 and 162 may be schematically identical to those in FIG. 2 but handle only the low powers during the PoE handshaking phase. The diode drops are not relevant to the overall efficiency of the system since they only occur during the low power PoE handshaking phase.

Figure 8:
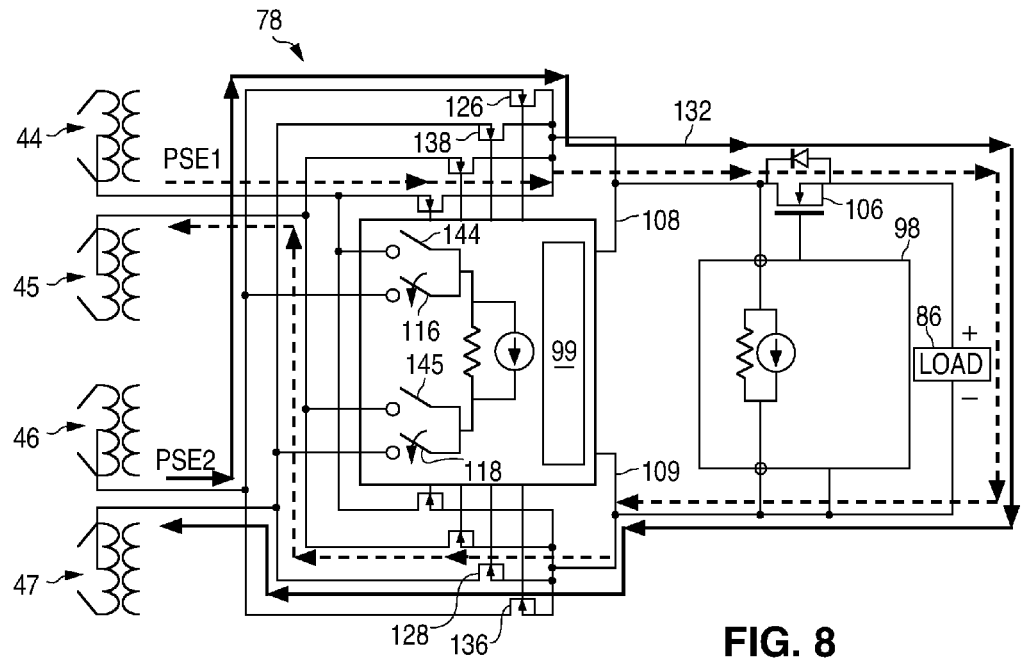
FIG. 8 illustrates the current conducted by the system of FIG. 3 after both the PSE1 channel and the PSE2 channel are coupled to the load.

The outputs of the diode bridges 160 and 162 are connected to switches 166, containing the switches 116, 118, 144, and 145 in FIG. 8, that couple one of the channels to the PoE handshaking circuit 170. The PoE handshaking circuit 170 contains the detection resistor 112 and the programmable current source 114 (FIG. 7) as well as any state machine or other logic that carries out the handshaking routine.

A detection circuit 172 closes one set of the switches 116, 118, 144, and 145 once it detected that the series MOSFET 106 in FIG. 6 has been closed to couple one of the channels to the load 86. This may be done by monitoring the voltage across the MOSFET 106, where a low voltage indicates that the MOSFET 106 is closed. Other signals may be used to determine that one channel is connected to the load 86, such as a POWER GOOD signal generated by a DC-DC converter in the load. Such a signal may be applied to the input terminal 174 of the bridge controller IC 80. The bridge controller IC 80 knows which channel is already connected to the load 86, since the bridge controller IC 80 closed the bridge MOSFETs for the channel connected to the load 86. Accordingly, the proper switches 166 are closed to couple the other channel to the PoE handshaking circuit 170.

After a successful PoE handshaking, the PoE handshaking circuit 170 enables the MOSFET bridge voltage detection and control circuit 99 to turn on the proper MOSFETs for coupling the PSE2 channel (in the example) to the load 86. The voltages applied to the PSE2 channel input terminals 83 and 85 and the voltage applied to the load voltage input terminals 108 and 109 are detected to determine the proper polarity and to ensure the PSE2 channel will not sink current from the load 86. The bridge MOSFETs are switched when the rising PSE2 channel voltage substantially equals the load voltage. This may be detected using comparators and well-known techniques. The polarity detection circuit 176 is shown, which may employ known polarity detection techniques.

If NMOS transistors are used in the bridge, a charge pump 178 is used to generate the high voltage needed for the gate voltages. The charge pump 178 may be powered by the initial low voltages supplied by either of the channels PSE1 or PSE2 during the handshaking phase or may use the load voltage at the terminals 108 and 109.

The polarity detection circuit 176 then controls drivers 180 for the bridge MOSFETs to turn on the proper MOSFETs.

Other configurations of the bridge controller IC 80 are envisioned.

The PSE1 and PSE2 may be part of a single PSE unit in an Ethernet switch connected to the 4 pairs of wires 44-47. PSE1 and PSE2 may each have its own power supply and PoE handshaking circuitry. PSE1 and PSE2 may communicate for various purposes, as required for the particular application.

Linear Technology Corporation has developed a PoE system, termed LTPoE++, where up to 90 W (and greater) is supplied by the four pairs of wires 44-47. In LTPoE++, only a single PSE-PoE controller is used for the detection and classification. The system of FIG. 3 may also be used with such a PoE++ system, where the detection and classifications function of the bridge controller IC 80 would not be used, since such functions would be totally handled by the PD interface controller 98 communicating with the PSE controller. The bridge controller IC 80 would perform all other tasks in the flowchart of FIG. 9, such as coupling the power from the wires 46 and 47 to the load 86, via the bridge MOSFETs, once the power from the wires 44 and 45 was coupled to the load 86. Accordingly, the present invention is backwards-compatible with both the UPoE system (two PSEs, each having a PSE-PoE controller) and the LTPoE++ system (one PSE-PoE controller). The present system is also compatible with IEEE 802.3 of (standard PoE) and 802.3at (PoE+).

Accordingly, the bridge controller IC 80, by detecting all the voltages simultaneously, controlling the MOSFET bridge, and coordinating the coupling of the power from the four pairs of wires without any interference in the detection and classification phases for the two channels and without sourcing power from one channel to the other, provides combined power to the load without any of the drawbacks of the prior art systems (e.g., FIG. 2).

After the PoE has been applied to the load 86, data may then be communicated between the PSE(s) and load through a separate data path, as is conventional.

Although, the PoE handshaking routine and circuitry has been described as conventional, other or future systems may use different handshaking routines and circuits or use only a subset. Accordingly, the present invention is intended to encompass such circuits that are used in any type of handshaking phase, where the present invention operates to isolate one channel from the other until such handshaking phase is completed.

The present invention is not limited to PoE, but may be applicable to any other system that combines power from two channels to a load. For example, in other systems, more than four pairs of wires may be used for data and power.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A system for combining power to a load in a Powered Device (PD) using Power Over Ethernet (PoE), the system receiving at least four pairs of wires from at least one Power Sourcing Equipment (PSE), the four pairs of wires comprising a first channel of two of the pairs of wires and a second channel of the other two pairs of wires, each pair of wires carrying a common mode voltage, the first channel supplying first voltages across the two pairs of wires, and the second channel supplying second voltages across the other two pairs of wires, the system comprising:

an active bridge comprising controllable bridge switches, a first set of the bridge switches being connected to the first channel for supplying the first voltages to the load, a second set of the bridge switches being connected to the second channel for supplying the second voltages to the load;

a first controller circuit comprising an active bridge controller circuit and a first interface controller circuit, the active bridge controller circuit controlling conduction of the first set of bridge switches and the second set of bridge switches, the first interface controller circuit containing a first PoE handshaking circuit to ensure the PD is compatible with the at least one PSE;

a second interface controller circuit, external to the first controller circuit, containing a second PoE handshaking circuit to ensure the PD is compatible with the at least one PSE;

a series switch controlled by the second interface controller circuit for supplying the first voltages to the load when turned on after a successful PoE handshaking routine performed by the second PoE handshaking circuit;

a detector in the first controller circuit configured to detect the supplying of the first voltages to the load; and a control circuit in the first controller circuit configured for carrying out the following routine:
- a. controlling the first set of bridge switches to be on to supply the first voltages supplied by the first channel to the load only after it has been detected that the second interface controller circuit has turned on the series switch to supply the first voltages to the load; and
- b. after step a, performing a PoE handshaking routine by the first PoE handshaking circuit via the second channel with the at least one PSE and, upon a successful PoE handshaking routine performed by the first PoE handshaking circuit, controlling the second set of bridge switches to be on to supply the second voltages to the load, such that power from the first channel and power from the second channel are combined to provide power to the load.

2. The system of claim 1 wherein the first set of bridge switches comprises first MOSFETs having first body diodes, wherein forward biased first body diodes conduct the first voltages until the first MOSFETs are controlled to be on in step a.

3. The system of claim 1 wherein the first controller circuit comprises a first diode bridge connected to the first channel, and a second diode bridge connected to the second channel.

4. The system of claim 3 wherein the first controller circuit further comprises a switch circuit that connects the second channel to the first PoE handshaking circuit only if the first channel initiates a PoE handshaking routine before the second channel initiates a PoE handshaking routine.

5. The system of claim 1 wherein the detector detects the supplying of the first voltages to the load by sensing a voltage across the series MOSFET.

6. The system of claim 1 wherein the detector detects the supplying of the first voltages to the load by sensing a voltage on at least one input terminal of the first controller circuit.

7. The system of claim 1 wherein the detector detects the supplying of the first voltages to the load by sensing a POWER GOOD signal, indicating that voltages above a certain threshold are being applied to the load.

8. The system of claim 1 wherein the at least one PSE comprises a first PSE and a second PSE, complying with IEEE standards 802.3 for PoE.

9. The system of claim 1 wherein the active bridge controller circuit comprises:
polarity detection circuitry for ensuring that the second voltages are approximately equal to or greater than the first voltages applied to the load prior to controlling the second set of bridge switches to be on to supply the second voltages to the load in step b.

10. The system of claim 1 wherein the four pairs of wires from the at least one Power Sourcing Equipment (PSE) comprises two pairs of differential data wires and two spare pairs of wires.

11. The system of claim 1 wherein the first set of bridge switches and second set of bridge switches comprise MOSFETs having body diodes.

12. The system of claim 1 wherein the first controller circuit simultaneously detects the first voltages and the second voltages.

13. A first controller circuit for combining power to a load in a Powered Device (PD) using Power Over Ethernet (PoE), the first controller circuit comprising:
first input terminals for receiving at least four pairs of wires from at least one Power Sourcing Equipment (PSE), the four pairs of wires comprising a first channel of two of the pairs of wires and a second channel of the other two pairs of wires, each pair of wires carrying a common mode voltage, the first channel supplying first voltages across the two pairs of wires, and the second channel supplying second voltages across the other two pairs of wires;

an active bridge controller circuit, the active bridge controller circuit being configured to control conduction of switches in an active bridge circuit having a first set of bridge switches and a second set of bridge switches, the first set of the bridge switches for being connected to the first channel for supplying the first voltages to the load, a second set of the bridge switches for being connected to the second channel for supplying the second voltages to the load;

a first interface controller circuit containing a first PoE handshaking circuit to ensure the PD is compatible with the at least one PSE;

a detector configured to detect the supplying of the first voltages to the load by a series switch controlled by an external second PoE handshaking circuit; and a control circuit for carrying out the following routine:
- a. controlling the first set of bridge switches to be on to supply the first voltages supplied by the first channel to the load only after it has been detected that the series switch has been turned on to supply the first voltages to the load; and
- b. after step a, performing a PoE handshaking routine by the first PoE handshaking circuit via the second channel with the at least one PSE and, upon a successful PoE handshaking routine performed by the first PoE handshaking circuit, controlling the second set of bridge switches to be on to supply the second voltages to the load, such that power from the first channel and power from the second channel are combined to provide power to the load.

14. The first controller circuit of claim 13 wherein the first set of bridge switches comprises first MOSFETs having first body diodes, wherein forward biased first body diodes conduct the first voltages until the first MOSFETs are controlled to be on in step a.

15. The first controller circuit of claim 13 wherein the first controller circuit comprises a first diode bridge connected to the first channel, and a second diode bridge connected to the second channel.

16. The first controller circuit of claim 13 wherein the first controller circuit further comprises a switch circuit that connects the second channel to the first PoE handshaking circuit only if the first channel initiates a PoE handshaking routine before the second channel initiates a PoE handshaking routine.

17. The first controller circuit of claim 13 wherein the detector detects the supplying of the first voltages to the load by sensing a voltage across the series MOSFET.

18. The first controller circuit of claim 13 wherein the detector detects the supplying of the first voltages to the load by sensing a voltage on at least one second input terminal of the first controller IC.

19. The first controller circuit of claim 13 wherein the detector detects the supplying of the first voltages to the load by sensing a POWER GOOD signal, indicating that voltages above a certain threshold are being applied to the load.

20. The first controller circuit of claim 13 wherein the at least one PSE comprises a first PSE and a second PSE, complying with IEEE standards 802.3 for PoE.

21. The first controller circuit of claim 13 wherein the active bridge controller circuit comprises:
   polarity detection circuitry for ensuring that the second voltages are approximately equal to or greater than the first voltages applied to the load prior to controlling the second set of bridge switches to be on to supply the second voltages to the load in step b.

22. The first controller circuit of claim 13 wherein the four pairs of wires from the at least one Power Sourcing Equipment (PSE) comprises two pairs of differential data wires and two spare pairs of wires.

23. The first controller circuit of claim 13 wherein the first set of bridge switches and second set of bridge switches comprise MOSFETs having body diodes.

24. The first controller circuit of claim 13 wherein the first controller IC simultaneously detects the first voltages and the second voltages.

* * * * *